United States Patent
Hsu

[11] Patent Number: 5,803,181
[45] Date of Patent: Sep. 8, 1998

[54] GARDENING EQUIPMENT FOR LOOSEING THE SOIL

[76] Inventor: Shih-Hao Hsu, No. 426, Tou-Yuan E. Rd., Pi-Tou Hsiang, Chang-Hua Hsien, Taiwan

[21] Appl. No.: 787,945

[22] Filed: Jan. 23, 1997

[51] Int. Cl.$^6$ .................................................. A01B 45/00
[52] U.S. Cl. ............................................. 172/21; 172/350
[58] Field of Search .................................. 172/21, 22, 429, 172/349, 546, 554, 552, 532, 371, 378, 331, 350, 351, 354, 355, 356, 361; 111/200, 901; 56/249, 294

[56] References Cited

U.S. PATENT DOCUMENTS

| | | | |
|---|---|---|---|
| 643,034 | 2/1900 | Bartels et al. | 172/552 X |
| 1,162,902 | 12/1915 | Colleys | 172/21 |
| 1,955,937 | 4/1934 | Allen | 172/21 |
| 2,034,505 | 3/1936 | Cline | 172/21 |
| 2,727,448 | 12/1955 | Taylor | 172/552 |
| 2,730,856 | 1/1956 | Mekalainas | 172/21 X |
| 2,827,751 | 3/1958 | Mascaro | 172/21 X |
| 3,148,737 | 9/1964 | Lunsford | 172/21 |
| 3,734,197 | 5/1973 | Zehrung, Jr. | 172/21 |
| 4,295,294 | 10/1981 | Rosenwinkel et al. | 46/205 |
| 4,899,828 | 2/1990 | Harris | 172/21 |
| 5,029,652 | 7/1991 | Whitfield | 172/21 |
| 5,142,852 | 9/1992 | Nelson | 172/21 X |

OTHER PUBLICATIONS

Mantis Manufacturing Co. advertisement, (see Lawn De–Thatcher), Oct. 1985.

*Primary Examiner*—Terry Lee Melius
*Assistant Examiner*—Victor Batson
*Attorney, Agent, or Firm*—Bacon & Thomas

[57] ABSTRACT

A gardening equipment for loosening the soil of a garden, including a polygonal axle having two screw rods at two opposite ends, two wheels respectively coupled to the polygonal axle, a plurality of tine bars coupled between the wheels and equiangularly spaced around the axle, a coupling device, and a handle coupled to the axle outside the wheels by the coupling device and adapted for moving the wheels over the soil by hand, causing the tines of the tine bars to loosen the coil.

4 Claims, 4 Drawing Sheets

GARDENING EQUIPMENT FOR LOOSEING THE SOIL

BACKGROUND OF THE INVENTION

The present invention relates to gardening equipment, and more specifically to a gardening equipment specifically designed for use to loosen the soil of a garden.

When planting seeds or new plants in the soil of a garden, the soil must be loosened. Conventionally, hoes and spades are used for loosening the soil. However, these gardening tools are commonly heavy. When to loosen the soil of a big land with a hoe or spade, much labor and time shall be consumed.

SUMMARY OF THE INVENTION

It is one object of the present invention to provide a gardening equipment which can be conveniently operated to loosen the soil with less effort. It is another object of the present invention to provide a gardening equipment for loosening the soil which is detachable and can be conveniently assembled by the user. It is still another object of the present invention to provide a gardening equipment for loosing the soil which is inexpensive to manufacture. According to the preferred embodiment of the present invention, the gardening equipment for loosening the soil comprises two wheels mounted two opposite ends of an axle, a plurality of tine bars connected between the wheels and spaced around the axle, and a handle coupled to the two opposite ends of the axle outside the wheels by a coupling device and adapted for turning the wheels over the soil by hand. The tines of each two adjacent tine bars are alternatively arranged. When the wheels are moved over the soil, the tines of the tine bars are forced to loosen the soil.

DETAILED DESCRIPTION OF THE PREFERRED EMBODIMENT

Figure 3:
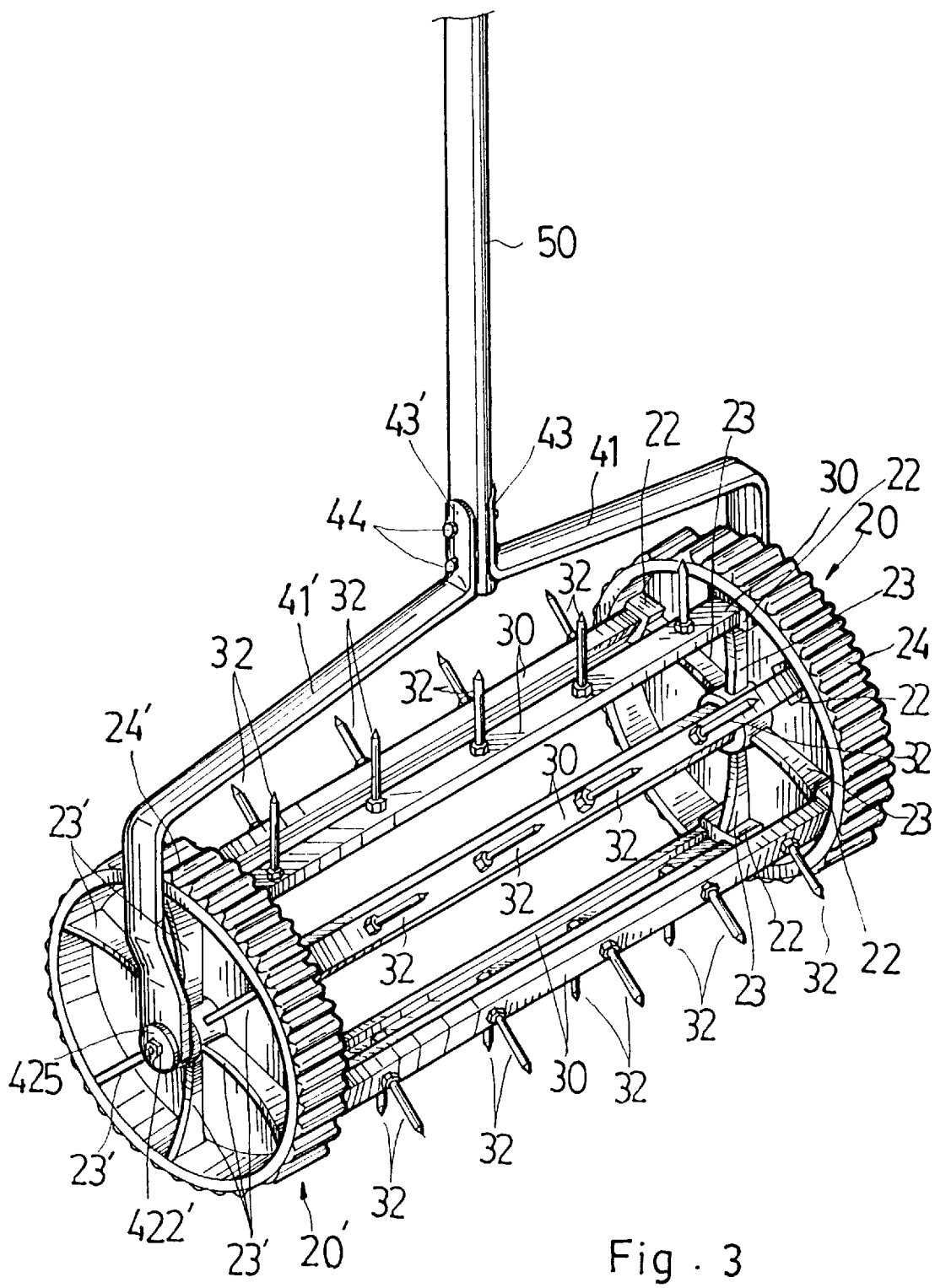
FIG. 3 is an elevational view of the gardening equipment shown in FIG. 1.

Referring to FIG. 3, a gardening equipment in accordance with the present invention is generally comprised of an axle 10, two wheels 20 and 20' mounted on two opposite ends of the axle 10, a plurality of tine bars 30 coupled between the wheels 20 and 20' and equiangularly spaced around the axle 10, a coupling device 40, and a handle 50 coupled to the axle 10 outside the wheels 20 and 20' by the coupling device 40.

Figure 1:
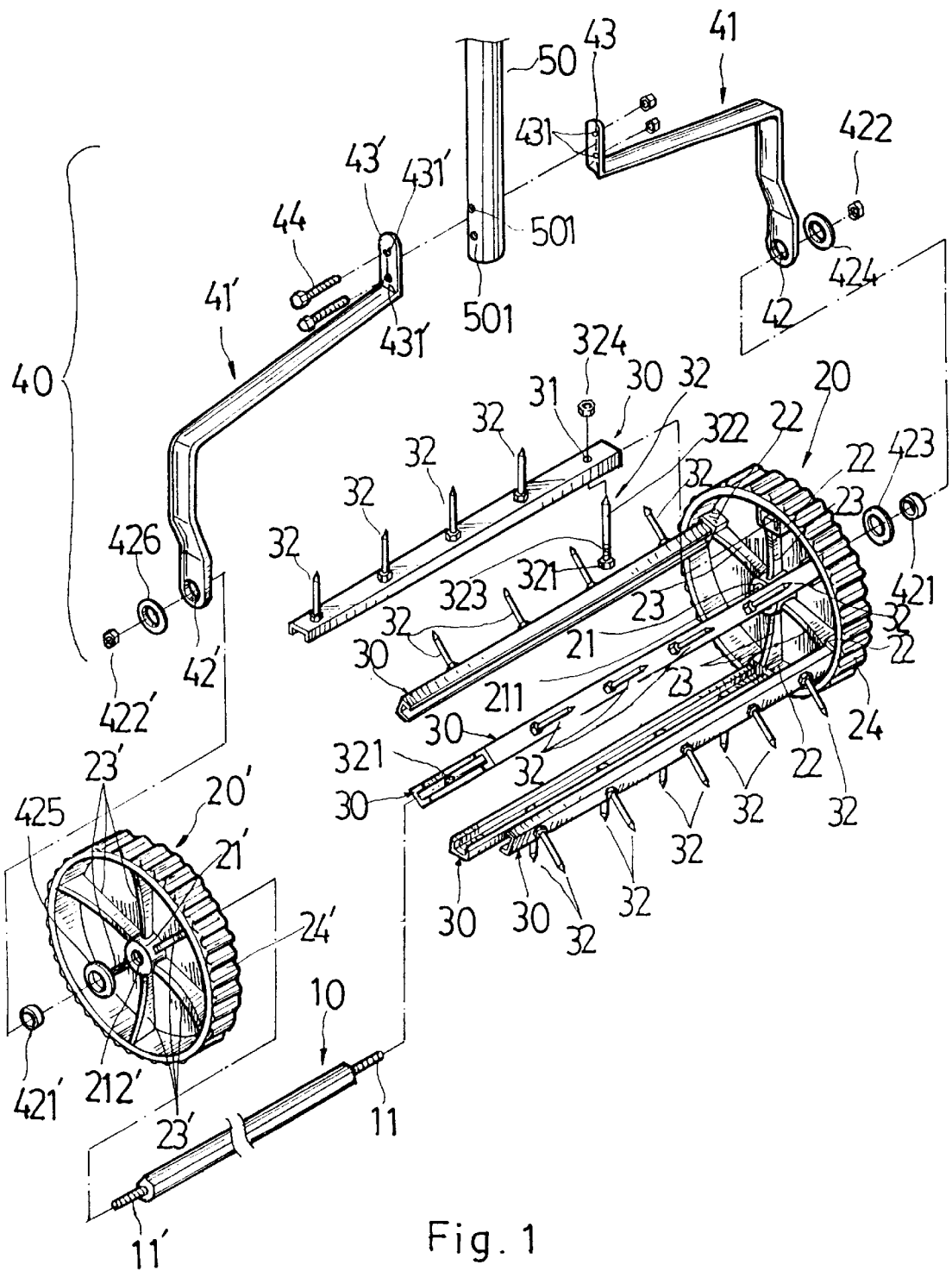
FIG. 1 is an exploded view of a gardening equipment for loosening the soil according to the present invention.
Figure 2:
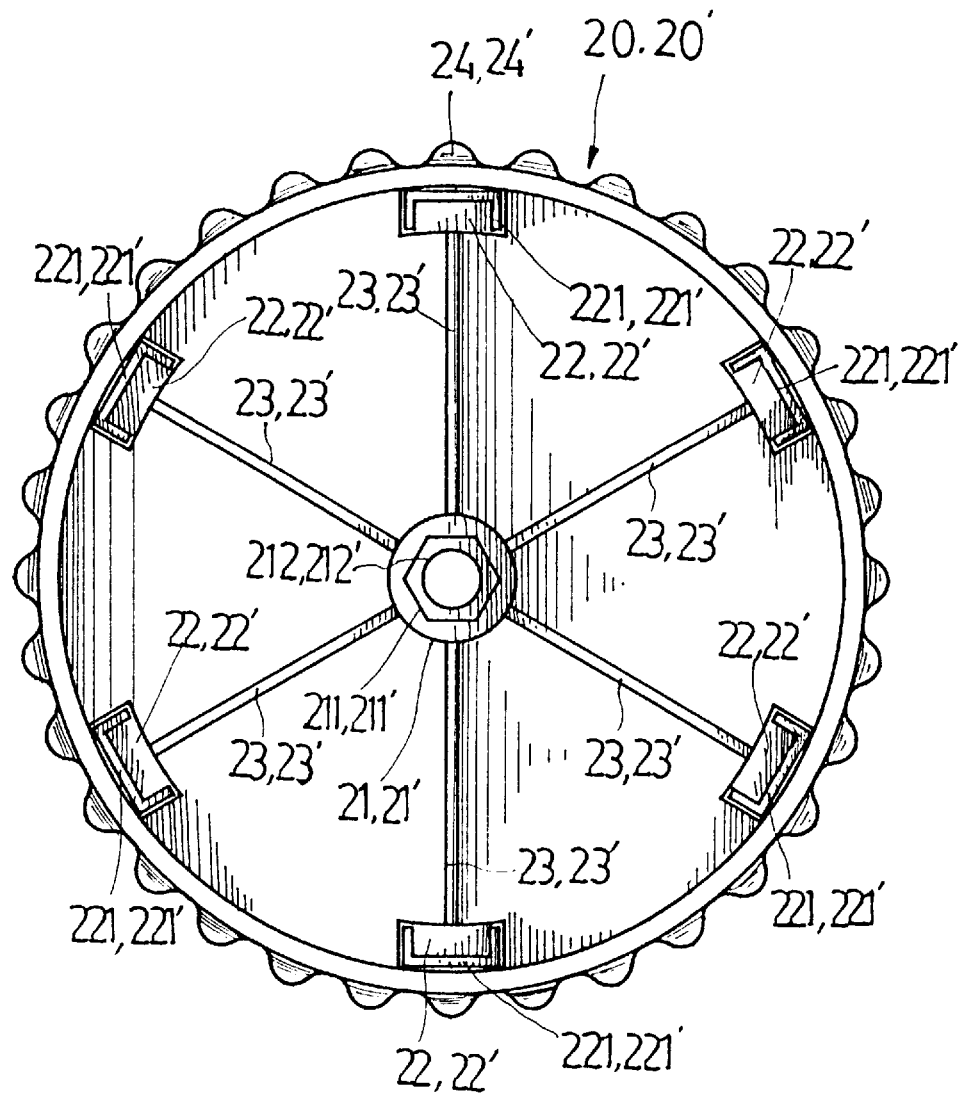
FIG. 2 is a plain view in an enlarged scale of one wheel of the gardening equipment shown in FIG. 1.

Referring to FIGS. 2 and 3 and FIG. 1 again, the axle 10 is a polygonal bar having two screw rods 11 and 11' longitudinally disposed at two opposite ends. The wheel 20 or 20' comprises a hub 21 or 21' at the center defining a polygonal coupling hole 211 or 211' at one side, which receives one end of the polygonal periphery of the axle 10, and a round hole 212 or 212' at an opposite side, which receives one screw rod 11 or 11' of the axle 10, a plurality of coupling blocks 22 or 22' equiangularly spaced at an inner side and defining a respective coupling groove 221 or 221' adapted for coupling to the tine bars 30, a plurality of radial ribs 23 or 23' raised from both sides and radially extended from the hub 21 or 21' to the coupling blocks 22 or 22' or the periphery, and a plurality of transverse teeth 24 or 24' equiangularly spaced around the periphery. The coupling groove 221 or 221' is an elongated groove having two opposite ends angled (namely, the coupling groove comprises an elongated middle section and two end sections perpendicularly extended from two opposite ends of the elongated middle section in the same direction, as shown in FIG. 2). The tine bars 30 are shaped like a channel bar respectively fitted into the coupling grooves 221 and 221' of the wheels 20 and 20', having a longitudinal row of through holes 31 and a plurality of tines 32 fastened to the through holes 31. The through holes 31 of each two adjacent tine bars 30 are alternatively arranged, so that the tines 32 of each two adjacent tine bars 30 are not respectively aligned. Each tine 32 comprises a pointed tine body 322 inserted through one through hole 31, a head 321 disposed at one end of the tine body 322 and stopped at the inner side of the respective tine bar 30, and an outer thread 323 near the head 321. When the pointed tine body 322 is inserted through one through hole 31 and the head 321 of of the respective tine 32 is stopped at the inside wall of the respective tine bar 30, a nut 324 is threaded onto the outer thread 322 to fix the tine 32 to the respective tine bar 30. The coupling device 40 comprises two links 41 and 41' coupled between the handle 50 and the screw rods 11 and 11' of the axle 10. Each link 41 or 41' comprises a coupling hole 42 or 42' at one end coupled to one screw rod 11 or 11' of the axle 10 by one bushing 421 or 421' and secured in place by a nut 422 or 422', and a mounting plate 43 or 43' at an opposite end fastened to one end of the handle 50. The mounting plates 43 and 43' have a cross section fitting over the periphery of the handle 50, and respective mounting holes 431 or 431' bilaterally fastened to respective through holes 501 at one end of the handle 50 by screws 44. Further, washers 424 and 426 may be respectively mounted around the screw rods 11 and 11' of the axle 10 and connected between the nuts 422 and 422 and the bushings 421 and 421'.

The assembly process of the gardening equipment is outlined hereinafter with reference to FIGS. from 1 to 3 again, one wheel, namely, the first wheel 20 is attached to one end of the axle 10, then the tine bars 30 are respectively fastened to the coupling grooves 221 of the first wheel 20, then the polygonal coupling hole 211' and coupling grooves 221' of the second wheel 20' are respectively coupled to the axle 10 and the tine bars 30, and then the coupling holes 42 and 42' of the links 41 and 41 are respectively coupling to the screw rods 11 and 11' of the axle 10, and then the mounting plates 43 and 43' of the links 41 and 41' are fixedly secured to the handle 50.

Figure 4:
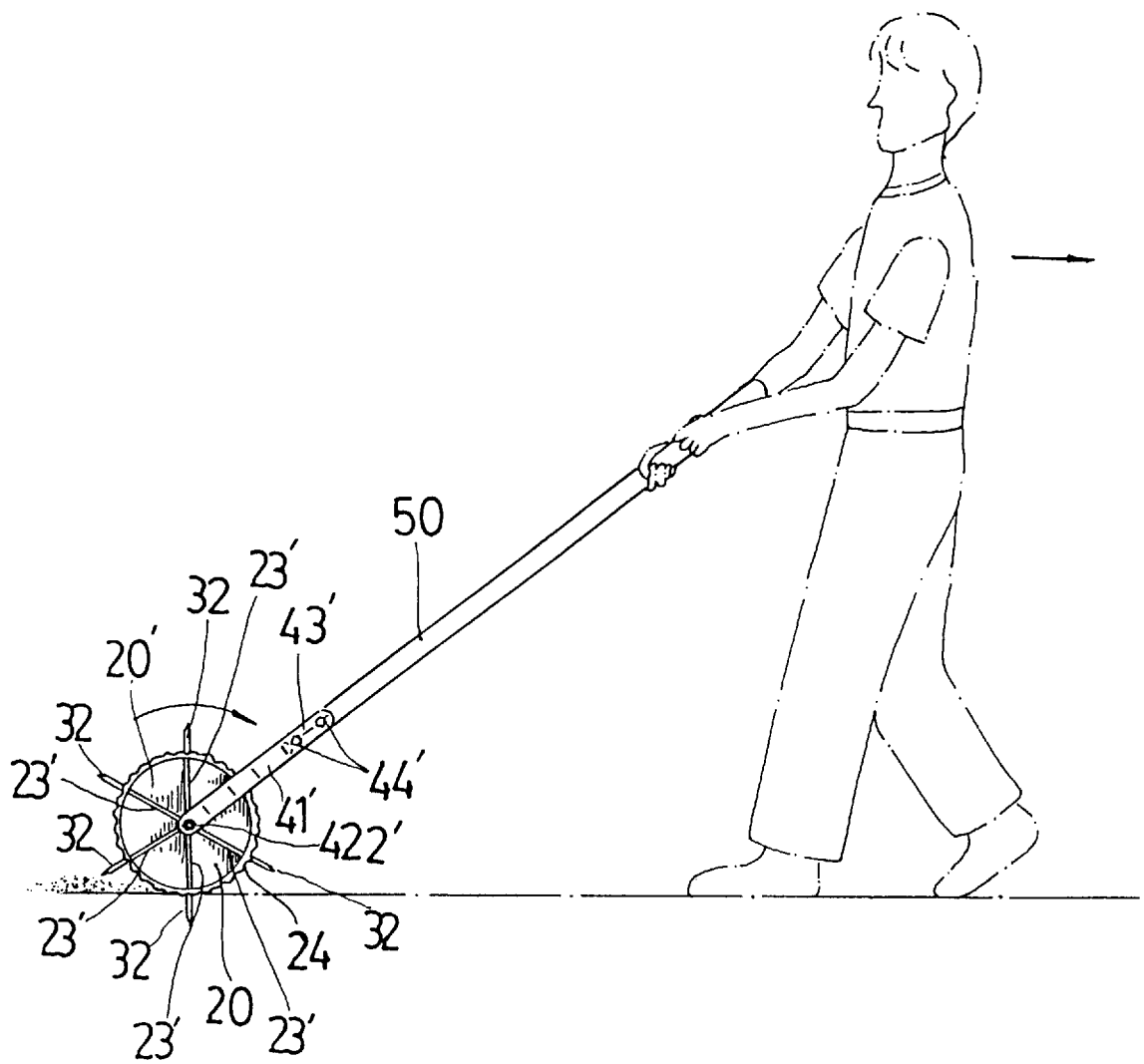
FIG. 4 is an applied view of the present invention, showing the gardening equipment moved over the soil.

Referring to FIG. 4, when in use, the gardening equipment is put on the soil of the garden, permitting the tines 32 of one tine bar 30 to be forced into the soil, than the handle is moved with the hand to turn the wheels 20 and 20' over the soil. When the wheels 20 and 20' are turned over the soil, the tine bars 30 are synchronously moved with the wheels 20 and 20' over the soil, causing the tines 32 to loosen the soil. Because the wheels 20 and 20' have transverse teeth 24 and 24' spaced around the periphery, much resisting force is produced between the wheels 20 and 20' and the soil when the equipment is moved over the soil, therefore the equipment can be positively turned over the soil. When not in use, the tines 32 can be disconnected from the tine bars 30, and the other parts of the equipment can be disconnected from one another to minimize storage space.

I claim:

1. A gardening implement comprising:

an axle having an axle body with a polygonal cross-sectional configuration and a screw rod extending from opposite ends of said axle body;

a wheel coupled to the opposite ends of said axle, each wheel comprising a plurality of transverse teeth equiangularly spaced around a periphery, a polygonal center coupling hole at one side coupled to one end of said polygonal axle body of said axle, a rounded center hole communicating with said polygonal center coupling hole enabling the passing of one screw rod of said axle, and a plurality of coupling grooves equiangularly spaced at one side near the periphery;

a plurality of tine bars fixedly attached between said wheels, each of said tine bars having opposite ends respectively, each opposite end fitted into one coupling groove of each of said wheels such that the tine bars do not pivot and rotate relative to the wheels, and a plurality of tines immovably attached to each tine bar, the tines extending outwardly beyond the peripheries of the wheels;

a handle for moving said axle and said wheels by hand; and a plurality of links coupled between one end of said handle and the screw rods of said axle.

2. The gardening implement of claim 1 wherein each of said tine bars has a longitudinal row of through holes for holding the tines of the respective tine bar, each of said tines comprising a pointed tine body inserted through one through hole of one tine bar, a head disposed at one end of said tine body and stopped against an inner side of the respective tine bar, and an outer thread adjacent said head with a nut threaded onto said outer threads at an outer side of the respective tine bar.

3. The gardening implement of claim 1 wherein each of said plurality of links comprises a coupling hole at one end coupled to one screw rod of said axle and secured thereto by a wheel nut, and a coupling plate at an opposite end fixedly fastened to one end of said handle by fastening elements, said coupling plate having a cross-sectional configuration fitting over a portion of the periphery of said one end of said handle.

4. The gardening implement of claim 1 wherein each of the coupling grooves of said wheels comprises an elongated middle section and two end sections extending perpendicularly from opposite ends of the elongated middle section in the same direction.

\* \* \* \* \*